United States Patent
Schaefer et al.

(10) Patent No.: US 10,601,092 B2
(45) Date of Patent: Mar. 24, 2020

(54) TEMPERATURE CONTROL APPARATUS FOR THE TEMPERATURE CONTROL OF AN ELECTRIC POWER SUPPLY UNIT

(71) Applicant: Mahle International GmbH, Stuttgart (DE)

(72) Inventors: Bernd Schaefer, Stuttgart (DE); Joachim Treier, Oppenau (DE); Stefan Hirsch, Stuttgart (DE)

(73) Assignee: Mahle International GmbH (DE)

( * ) Notice: Subject to any disclaimer, the term of this patent is extended or adjusted under 35 U.S.C. 154(b) by 284 days.

(21) Appl. No.: 15/510,680

(22) PCT Filed: Jul. 30, 2015

(86) PCT No.: PCT/EP2015/067583
§ 371 (c)(1),
(2) Date: Mar. 10, 2017

(87) PCT Pub. No.: WO2016/037763
PCT Pub. Date: Mar. 17, 2016

(65) Prior Publication Data
US 2018/0083328 A1    Mar. 22, 2018

(30) Foreign Application Priority Data

Sep. 12, 2014 (DE) .................. 10 2014 218 377

(51) Int. Cl.
*H01M 10/6556* (2014.01)
*H01M 10/625* (2014.01)
(Continued)

(52) U.S. Cl.
CPC ..... *H01M 10/6556* (2015.04); *H01M 10/613* (2015.04); *H01M 10/615* (2015.04);
(Continued)

(58) Field of Classification Search
CPC combination set(s) only.
See application file for complete search history.

(56) References Cited

U.S. PATENT DOCUMENTS 4,738,906 A * 4/1988 Sanders ............. H01M 10/625
180/68.5
8,492,642 B2 7/2013 Kim
(Continued)

FOREIGN PATENT DOCUMENTS

CN    1753242 A    3/2006
CN    105098287 A   11/2015
(Continued)

OTHER PUBLICATIONS

Machine Translation of JP2000-095198A printed Apr. 27, 2019 (Year: 2019).*
(Continued)

*Primary Examiner* — Maria Laios
(74) *Attorney, Agent, or Firm* — Fishman Stewart PLLC

(57) ABSTRACT

A temperature control apparatus for the temperature control of an electrical power supply unit may include a cooling device, at least one heating device, and a heat transfer component. The heat transfer component may provide a thermal coupling for the cooling device and the at least one heating device. The cooling device, the at least one heating device, and the heat transfer component may be thermally coupled to each other and stacked one on top of the other in a stacking direction. The cooling device may include at least one fluid path through which a fluid is flowable. The at least one heating device may include at least one electrical heating element arranged between an electrically conductive first contact plate and an electrically conductive second contact plate. The heat transfer component may also include a first side that faces the first contact plate and includes at least one recess.

20 Claims, 2 Drawing Sheets

(51) Int. Cl.
*H01M 10/615* (2014.01)
*H01M 10/6554* (2014.01)
*H01M 10/613* (2014.01)
*H01M 10/6571* (2014.01)
*H05B 3/42* (2006.01)

(52) U.S. Cl.
CPC ..... *H01M 10/625* (2015.04); *H01M 10/6554* (2015.04); *H01M 10/6571* (2015.04); *H05B 3/42* (2013.01)

(56) References Cited

U.S. PATENT DOCUMENTS

| | | | |
|---|---|---|---|
| 2011/0206967 A1* | 8/2011 | Itsuki | B60K 1/04 429/120 |
| 2014/0220397 A1 | 8/2014 | Hirsch et al. | |

FOREIGN PATENT DOCUMENTS

| | | |
|---|---|---|
| DE | 102011003296 A1 | 8/2012 |
| DE | 102011084002 A1 | 4/2013 |
| EP | 2388851 A1 | 11/2011 |
| EP | 2343769 B1 | 7/2018 |
| JP | 2000095198 A * | 4/2000 |
| WO | WO-9206570 A1 | 4/1992 |

OTHER PUBLICATIONS

English abstract for EP-2388851.
English abstract for JP-2000095198.
English abstract for DE-102011003296.
German Search Report for DE-102014218377.4, dated Jul. 31, 2015.
Chinese Office Action dated Dec. 11, 2018 related to corresponding Chinese Patent Application No. 201580060562.8.

* cited by examiner

TEMPERATURE CONTROL APPARATUS FOR THE TEMPERATURE CONTROL OF AN ELECTRIC POWER SUPPLY UNIT

CROSS-REFERENCE TO RELATED APPLICATIONS

This application claims priority to Germany Patent Application No. 10 2014 218 377.4 filed on Sep. 12, 2014, and International Patent Application No. PCT/EP2015/067583 filed on Jul. 30, 2015, the contents of which are hereby incorporated by reference.

TECHNICAL FIELD

The invention relates to a temperature control apparatus for the temperature control of an electric power supply unit and a temperature control arrangement with at least one such temperature control apparatus.

BACKGROUND

Rechargeable battery systems for electric vehicle with purely electric drive and for hybrid vehicles and vehicles with fuel cell drive are the subject of current research. At present, in the said types of vehicle lithium-ion batteries are preferably used, which are distinguished by a high energy density and an only poorly pronounced memory effect. The capability of a rechargeable battery to reliably supply with electric power various electric consumers installed in motor vehicles depends to a considerable extent on the thermal conditions prevailing in the environment of the battery. The electrochemical processes occurring both in the provision and also in the receiving of electric power in the sense of a recharging in the battery are dependent to a not insignificant extent on the operating temperature of the battery. Extensive investigations on different battery systems based on lithium-ion have shown for instance that below a critical temperature, for instance in the range of approximately 0° C., the electrical energy density made available by the battery decreases intensively compared to higher operating temperatures. Below the critical temperature, in addition damage to the li-ion cell can occur during charging.

A crucial factor for a reliable and trouble-free operation of said batteries—this applies not only to said batteries based on lithium-ion, but generally for any desired rechargeable battery systems—is consequently the creation of thermally well-defined environmental conditions. This means, with regard to the considerable temperature fluctuations occurring for instance in a motor vehicle during normal operation, that these must be equalized by suitable temperature control apparatus coupled thermally to the battery. Such a device must be able, on the one hand, to increase the environmental temperature in the immediate vicinity of the battery, if this assumes a value which lies below the permissible temperature range. On the other hand, the possibility must also exist to reduce the environmental temperature, if this does not upwardly exceed said temperature interval.

Various temperature apparatuses, able to be thermally coupled to a battery, are known from the prior art, which generally comprise both a heating unit for increasing the battery temperature and also a cooling system for reducing the battery temperature.

Thus in DE 10 2009 90 588 19 A1 a device is described for heating and cooling a battery, which has a coolant circuit and at least on electrical heating element, which are both arranged in a common heat transfer component. The electrical heating element is connected here in a form-fitting and/or force-fitting manner to the heat transfer component. It is characteristic for the device that it requires a relatively large number of components, which during a heating process are also heated by the heating element, due to the construction, which distinctly increases the heating output necessary for the heating of the battery which is actually aimed for.

It is an object of the present invention to provide an improved temperature control apparatus for a power supply unit, which realizes an effective thermal coupling to this power supply unit and at the same time is distinguished by a simple structural composition with a small number of components. A further object of the invention consists in providing a temperature control arrangement with at least one such temperature control apparatus.

This problem is solved by the subject of the independent claims. Preferred embodiments are the subject of the dependent claims.

SUMMARY

A temperature control apparatus according to the invention has a cooling device for cooling the power supply unit—the power supply unit which is to be temperature-controlled is designated below as "battery" for simplicity—and at least one heating device for heating the battery. The thermal coupling of the two devices to the battery which is to be temperature-controlled takes place by means of a heat transfer component, which serves as a thermal interface between heating- or respectively cooling device on the one hand and battery, which is to be temperature-controlled, on the other. In order to keep the installation space required for the entire temperature control apparatus as small as possible, the heat transfer component, the heating device and the cooling device are stacked one on top of the other in a stacking direction. This assists in particular a realization of the temperature control apparatus in flat construction. The cooling device has at least one fluid path for a coolant to flow through. Accordingly, the at least one heating device has respectively at least one electrical heating element, preferably a plurality of electrical heating elements, which is arranged between an electrically conductive first contact plate and an electrically conductive second contact plate. The two contact plates serve to connect the electrical heating elements electrically to an external energy source. At the same time, by means of the first electrically conductive contact plate, which is preferably produced from a metal, the heat transfer between the electrical heating elements and the heat transfer component, and therefore also the battery, can be significantly improved.

In a preferred embodiment, the heat transfer component is constructed as a base plate which has at least on a first side, facing away from the at least one heating device, a substantially flat surface for the thermal coupling of the electrical power supply unit. The construction of the heat transfer component as a base plate leads to at least the installation space necessary in the stacking device being able to be kept small. This facilitates the installation of the temperature control apparatus in a motor vehicle for the temperature control of the battery cells, which are present there, of a rechargeable battery.

If the temperature control apparatus is to be equipped with more than only one heating device, it proves to be advantageous to equip each of the heating devices with a housing which together with the heat transfer component delimits a housing interior. In this housing interior, the components of the heating device, therefore at least the two electrical contact plates, can be arranged with the at least one heating element. This provision assists a modular construction of the temperature control apparatus with a plurality of heating devices, but can also be used in a temperature control apparatus with only a single heating device.

Particularly expediently, the housing has a housing cover which lies on a side of the second contact plate facing away from the at least one heating element. Said housing cover is expediently completely surrounded by a housing collar, which projects from the housing cover towards the heat transfer component. The housing collar, in turn, lies with its face side against a second side of the heat transfer component facing the first contact plate.

With regard to a stable fastening of the housing and of the components of the heating device received therein on the heat transfer component, various options open up for the specialist in the art: The fastening of the housing collar and/or of the housing cover on the heat transfer component by means of a screwed connection or by means of an adhesive connection is conceivable. Alternatively, it may also be considered to fasten the housing or respectively the housing collar or by means of pressing or by means of clamping on the heat transfer component. In the latter case, it also presents itself to provide holding lugs on the heat transfer component, which press the housing against the heat transfer component.

In a variant of the example, the heating device with the two electrically conductive contact plates and the heating elements, arranged therebetween, can also be injected around by a housing made of plastic.

In a further preferred embodiment, at least one recess can be provided on the second side of the heat transfer component, in which recess the at least one heating device is received. In this way, the installation space taken up by the entire temperature control apparatus can be reduced. At the same time, in this way the heat transfer between the heating device and the heat transfer component will also improve.

In order to insulate the electrical heating elements and the two electrically conductive contact plates electrically with respect to the cooling device, it is proposed in a further preferred embodiment to use in particular a plastic as material for the electrically insulating material.

In an advantageous further development of the embodiment previously mentioned, at least two recesses, arranged at a distance from one another, can be arranged on the second side of the heat transfer component, in which recesses respectively a heating device is received. In a further development of this idea, it is also conceivable to provide, in an application-specific manner, a plurality of such recesses with respective heating devices. In this way, a modular construction of the temperature control device can be realized, in which the number of heating devices can be adapted to the overall heating output which is to be provided by the temperature control apparatus.

Particularly advantageously, the cooling device can also be received in the at least one recess. This leads to an improved thermal coupling of the cooling device to the heat transfer component and the at least one heating device.

A flat construction of the temperature control apparatus can be achieved according to an advantageous further development in which the second side of the heat transfer component terminates flush with a side of the cooling device facing away from the heating device.

In another preferred embodiment, the heat transfer component can be constructed at least in two parts and can have a first part and at least a second part. The first part is constructed here substantially as a flat plate. The at least one second component can be constructed as a frame in which the at least one recess is constructed as a through-opening. Such a multi-part construction of the heat transfer component can lead to considerably reduced manufacturing costs for the manufacture of the temperature control apparatus.

In a further preferred embodiment, the housing covers of the at least two heating devices can be formed integrally against one another. This applies in particular to embodiments in which a plurality of heating devices is used. In this way, the number of components required for the temperature control apparatus can be reduced. In particular, the assembly of the temperature control apparatus is simplified.

In order to electrically insulate the electrical heating elements and the two electrically conductive contact plates with respect to the heat transfer component, in another preferred embodiment it is proposed to provide an electrically insulating insulation layer between the first contact plate and the heat transfer component.

Particularly expediently, the electrically insulating insulation layer can be constructed as a film, in particular of silicone, or as an adhesive layer of an electrically insulating adhesive. Both provisions allow the electrical insulation layer to be applied in a simple manner before the assembly of the first contact plate on the heat transfer component on the first contact plate or on the heat transfer component. This leads to a not insignificant cost reduction in the production of the temperature control apparatus.

In another preferred embodiment, the cooling device is constructed as a flat pipe, which is arranged on a side of the housing cover facing away from the at least one heating element, and has at least one fluid channel for a coolant to flow through.

For supplying the cooling device with a coolant, the flat pipe can have, on a side facing away from the at least one heating device, a fluid inlet, communicating fluidically with the at least one fluid channel, for introducing the fluid into the fluid channel. In an analogous manner, it can also have on the same side of the flat pipe, a fluid outlet, communicating fluidically with the at least one fluid channel, for directing the fluid out from the fluid channel.

The invention further relates to a temperature control arrangement with at least one presented temperature control apparatus. The temperature control arrangement further comprises at least one power supply unit, which is arranged on a side of the heat transfer component, on the latter, said side facing away from the heating device, and is thermally coupled therewith.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
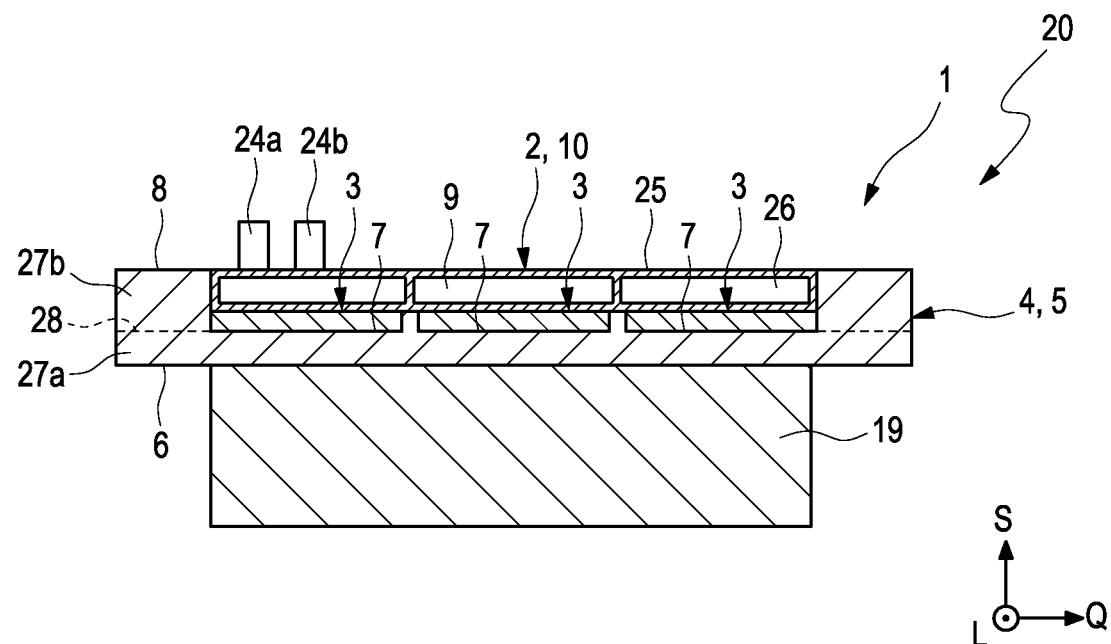
FIG. 1 an example of a temperature control arrangement according to the invention, in a longitudinal section, FIG. 2 an example of a temperature control apparatus according to the invention, in a longitudinal section, FIG. 3 a variant of the temperature control apparatus of FIG. 1 in a top view onto the heat transfer component.

FIG. 1 illustrates in a rough diagrammatic illustration an example of a temperature control apparatus 1 according to the invention for the temperature control of an electrical power supply unit in the form of a rechargeable battery 19 of a motor vehicle. The temperature control apparatus 1 comprises a cooling device 2, three heating devices 3 and a heat transfer component 4 for the thermal coupling of the cooling device 2 and the heating devices 3 to the battery 19. The battery 19 and the temperature control apparatus 1 together form a temperature control arrangement 20 according to the invention.

As FIG. 1 shows, the heat transfer component 4 can be constructed as a base plate 5, which has a substantially flat surface on a first side 6 facing away from the three heating devices 3. This makes it possible to bring the heat transfer component 4 flat in abutment against the battery 19, whereby its optimum thermal coupling with the battery 19 can be achieved. The heat transfer component 4 can be produced from an electrically and thermally conductive material, such as a metal, for example.

The cooling device 2, the three heating devices 3 and the heat transfer component 4 are thermally coupled to each other and are stacked one on top of the other in a stacking direction S. The heat transfer component 4 serves primarily to homogenize the thermal contact between the battery 20 and the cooling device 2 or respectively the heating devices 3. The cooling device 2 is constructed as a flat pipe 10 and comprises one or several fluid paths 9, indicated only roughly diagrammatically in FIG. 1, which can be respectively flowed through by a coolant. As likewise only indicated diagrammatically in FIG. 1, the flat pipe 10 can have, on a side 25 facing away from the heating devices 3, a fluid inlet 24a, communicating fluidically with the at least one fluid channel, for introducing the fluid into the fluid channel, and a fluid outlet 24b, communicating fluidically with the at least one fluid channel, for directing the fluid out from the fluid channel.

The three heating devices 3 are received in the heat transfer component 4 in recesses 7, which are provided on a first side 8 of the heat transfer component 4 facing the cooling device 2, and are constructed in a complementary manner to the heating devices 3.

As FIG. 1 shows, the cooling device 2 can also be received in the recesses 7. In the example scenario, the cooling device 2 is arranged in a recess region 26 formed jointly by the three recesses 7. Preferably, the arrangement of the cooling device 2 in the common recess region 26 of the recesses 7 takes place in such a way that the second side 8 of the heat transfer component 4 terminates flush with a side 25 of the cooling device 2 facing away from the heating devices 3.

In a further variant, the heat transfer component 4 can be constructed in several parts. It is conceivable, for example, to construct a first part 27a of the heat transfer component 4, facing the battery 19 with respect to the stacking direction S, as a flat plate, which in stacking direction S lies flat against a second component 27b constructed as a frame. In the second component 27b, the recesses 7 can be constructed as through-openings. Such an optional two-part construction of the heat transfer component 4 is indicated in FIG. 1 by the dividing line 28.

Figure 2:
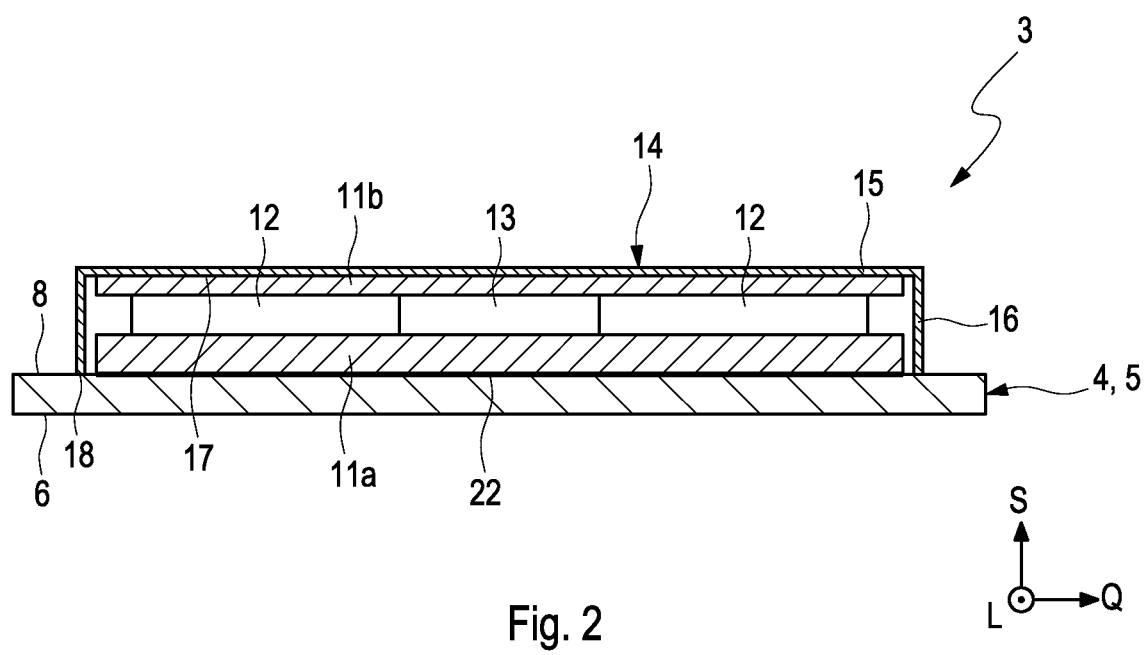

FIG. 2 now shows by way of example one of the three heating devices 3 in a detail illustration and in a longitudinal section along the stacking direction S. The heating device 3 comprises in the example of FIG. 2 two electrical heating elements 12, which are arranged between an electrically conductive first contact plate 11a and an electrically conductive second contact plate 11b. The electrical heating elements 12 can be conventional PTC heating elements. For the electrical insulation of the electrically conductive contact plates 11a, 11b with respect to the likewise electrically conductive heat transfer component 4, an electrically insulating insulation layer 22 is provided between the first contact plate 11a and the heat transfer component 4. This can be constructed as a film, in particular as a silicone film, or as an adhesive layer of an electrically insulating adhesive.

As FIG. 2 additionally shows, the heating device 3 furthermore also comprises a housing 14, which together with the heat transfer component 4 delimits a housing interior 13 of the heating device 3. The housing 14 is produced from an electrically insulating material, for example from a plastic. In the housing interior 13, the two electrically conductive contact plates 11a, 11b are arranged with the electrical heating elements 12.

As FIG. 2 clearly demonstrates, the housing 14 has a housing cover 15, which on a side 17, facing away from the electrical heating elements 12, of the second contact plate 11b lies against the latter. The housing cover 16 is completely surrounded by a housing collar 16, which protrudes from the housing cover 15 to the heat transfer component 4. The housing collar 16 lies with its face side 18 on a second side 8 of the heat transfer component 4, facing the first contact plate 11. The housing collar 16 can be fastened to the heat transfer component 4 by means of a screwed connection, an adhesive connection, or by means of pressing in or by means of clamping.

If a plurality of heating devices 3 are to be installed in the temperature control apparatus 1, it presents itself to form the respective housing covers 15 integrally against one another, so that they can be inserted as a single component during the mounting of the heating devices 3 into the recesses 7 (cf. FIG. 1). With such a configuration, the shared housing cover can be realized in the manner of a housing frame.

Figure 3:
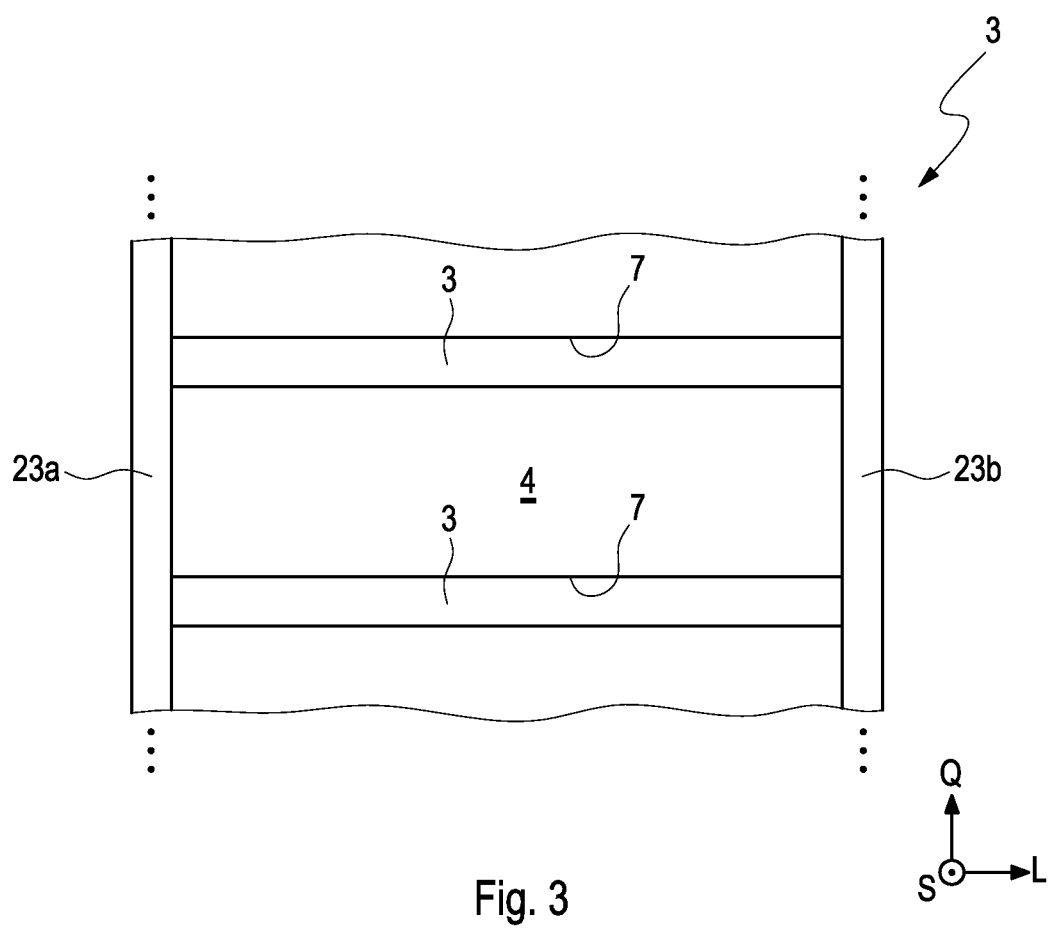

FIG. 3 shows a technically particularly preferred form of realization of the temperature control apparatus 1 of FIG. 1. FIG. 3 shows a detail of the temperature control apparatus 1 without housing and without the cooling device 2, in a top view. In the latter, the first electrical contact plates 11a of the heating devices 3 are connected to one another electrically by means of a first common bus bar 23a. The same applies to a second bus bar 23b, by means of which the second electrical contact plates 11b are electrically connected to one another. The two bus bars 23a, 23b serve to connect the electrical heating elements 12, via the electrical contact plates 11a, 11b, with a plus pole or respectively minus pole of an external electrical power source. In the example of FIG. 3, the electrical heating elements 11 are constructed so as to be longitudinal in shape and extend respectively along a longitudinal direction L running orthogonally to the stacking direction S. The two bus bars 23a, 23b, which are both likewise constructed so as to be longitudinal in shape, extend, on the other hand, transversely to the longitudinal direction L along a transverse direction R, which likewise runs orthogonally to the stacking direction S. In other words, the longitudinal direction L, the transverse direction R and the stacking direction S form the basis of a Cartesian coordinate system.

The invention claimed is:

1. A temperature control apparatus for the temperature control of an electrical power supply unit, comprising:
a cooling device, at least one heating device, and a heat transfer component providing a thermal coupling for the cooling device and the at least one heating device, the cooling device, the at least one heating device, and the heat transfer component arranged stacked one on top of the other in a stacking direction and thermally coupled to each other;
the cooling device including at least one fluid path for a coolant to flow through;
the at least one heating device including at least one electrical heating element arranged between an electrically conductive first contact plate and an electrically conductive second contact plate;
the heat transfer component including at least one recess disposed on a side of the heat transfer component facing towards the cooling device in the stacking direction; and
wherein the at least one heating device and the cooling device are arranged in the at least one recess of the heat transfer component.

2. The temperature control apparatus according to claim 1, wherein the at least one heating device is disposed in the at least one recess between the heat transfer component and the cooling device in the stacking direction, and wherein the heat transfer component is structured as a base plate having a substantially flat surface at least on another side facing away from the at least one heating device to facilitate the thermal coupling.

3. The temperature control apparatus according to claim 1, wherein the at least one heating device includes a housing, the housing together with the heat transfer component defining a housing interior; and
wherein the first contact plate, the second contact plate, and the at least one electrical heating element are arranged within the housing interior.

4. The temperature control apparatus according to claim 3, wherein:
the housing includes a housing cover, the housing cover lying against a side of the second contact plate that faces away from the at least one electrical heating element;
a housing collar completely surrounds the housing cover, the housing collar protruding from the housing cover toward the heat transfer component; and
the housing collar includes a face side that lies against the side of the heat transfer component having the at least one recess.

5. The temperature control apparatus according to claim 3, wherein the housing includes an electrically insulating material.

6. The temperature control apparatus according to claim 4, wherein the housing collar is secured to the heat transfer component via at least one of a screwed connection, an adhesive connection, a clamped connection and a pressed in connection.

7. The temperature control apparatus according to claim 4, wherein the at least one heating device includes at least two heating devices, and wherein the housing cover of each of the at least two heating devices is structured integrally against one another.

8. The temperature control apparatus according to claim 6, wherein:
that at least one heating device includes at least two heating devices;
the first electrical contact plate of each of the at least two heating devices is electrically connected to each other via a first common bus bar;
the second electrical contact plate of each of the at least two heating devices is electrically connected to each other via a second common bus bar; and
the first common bus bar and the second common bus bar are arranged for connecting to an external power source.

9. The temperature control apparatus according to claim 1, wherein the side of the heat transfer component having the at least one recess includes at least two recesses arranged at a distance from one another, the at least two recesses each configured to receive a respective heating device.

10. The temperature control apparatus according to claim 1, wherein the side of the heat transfer component having the at least one recess terminates flush with a side of the cooling device that faces away from the at least one heating device.

11. The temperature control apparatus according to claim 1, wherein:
the heat transfer component includes at least two parts, the at least two parts including a first part and a second part;
the first part is structured as a substantially flat plate;
the second part is structured as a frame and includes the at least one recess; and
the at least one recess is a through-opening.

12. The temperature control apparatus according to claim 1, wherein the cooling device comprises a flat pipe having at least one fluid channel that defines the at least one fluid path for the coolant.

13. The temperature control apparatus according to claim 12, wherein the flat pipe includes:
a fluid inlet in fluid communication with the at least one fluid channel and arranged on a side of the flat pipe that faces away from the at least one heating device; and
a fluid outlet in fluid communication with the at least one fluid channel.

14. A temperature control arrangement, comprising:
at least one temperature control apparatus, the at least one temperature control apparatus including:
a cooling device including at least one flow path for a fluid flow;
at least one heating device including at least one electrical heating element arranged between an electrically conductive first contact plate and an electrically conductive second contact plate;
a heat transfer component providing a thermal coupling for the cooling device and the at least one heating device;
wherein the cooling device, the at least one heating device, and the heat transfer component are arranged stacked one on top of the other in a stacking direction and thermally coupled to one another;
wherein the heat transfer component includes at least one recess disposed on a first side that faces the first contact plate, and the at least one recess receives that at least one heating device and the cooling device;
wherein the cooling device comprises a flat pipe disposed on an outer side of the at least one heating device facing away from the at least one electrical heating element, the flat pipe having at least one fluid channel defining the at least one flow path for the fluid flow;
at least one power supply unit; and
wherein the at least one power supply unit is arranged on a second side of the heat transfer component that faces away from the at least one heating device and is thermally coupled therewith.

15. The temperature control arrangement according to claim 14, further comprising a housing, structured and arranged to delimiting a housing interior together with the heat transfer component, wherein the at least one heating device is arranged within the housing interior.

16. The temperature control arrangement according to claim 15, wherein the housing includes a housing cover that lies against a side of the second contact plate that faces away from the at least one electrical heating element, and a surrounding housing collar that protrudes from the housing cover toward the heat transfer component.

17. The temperature control arrangement according to claim 15, wherein at least one of:
   the housing collar is secured to the heat transfer component via at least one of a screwed connection, an adhesive connection, a clamped connection and a pressed in connection; and
   the flat pipe of the cooling device is arranged on a side of the housing cover facing away from the housing interior.

18. The temperature control arrangement according to claim 14, wherein the at least one power supply unit comprises a battery.

19. A temperature control apparatus for the temperature control of an electrical power supply unit, comprising:
   a cooling device including at least one fluid path for a coolant to flow through;
   at least one heating device including at least one electrical heating element arranged between an electrically conductive first contact plate and an electrically conductive second contact plate;
   a heat transfer component providing a thermal coupling for the cooling device and the at least one heating device, the heat transfer component including at least one recess;
   an electrically insulating insulation layer for electrically insulating the at least one heating device with respect to the heat transfer component;
   wherein the cooling device, the at least one heating device, and the heat transfer component arranged stacked one on top of the other in a stacking direction and thermally coupled to each other, and the at least one heating device and the cooling device are arranged in the at least one recess of the heat transfer component; and
   wherein the electrically insulating insulation layer is disposed between the first contact plate of the at least one heating device and the heat transfer component.

20. The temperature control apparatus according to claim 19, wherein the electrically insulating insulation layer comprises a silicone film or an electrically insulating adhesive.

* * * * *